(12) United States Patent
Shen et al.

(10) Patent No.: US 10,572,718 B2
(45) Date of Patent: Feb. 25, 2020

(54) BODY INFORMATION ANALYSIS APPARATUS AND FOUNDATION ANALYSIS METHOD THEREFOR

(71) Applicant: CAL-COMP BIG DATA, INC., New Taipei (TW)

(72) Inventors: Shyh-Yong Shen, New Taipei (TW); Min-Chang Chi, New Taipei (TW); Eric Budiman Gosno, New Taipei (TW)

(73) Assignee: CAL-COMP BIG DATA, INC., New Taipei (TW)

( * ) Notice: Subject to any disclaimer, the term of this patent is extended or adjusted under 35 U.S.C. 154(b) by 99 days.

(21) Appl. No.: 15/870,994

(22) Filed: Jan. 14, 2018

(65) Prior Publication Data

US 2019/0087643 A1    Mar. 21, 2019

(30) Foreign Application Priority Data

Sep. 15, 2017    (CN) .......................... 2017 1 0834373

(51) Int. Cl.
*G06K 9/00* (2006.01)
*G06T 7/90* (2017.01)
(Continued)

(52) U.S. Cl.
CPC ....... *G06K 9/00281* (2013.01); *A45D 44/005* (2013.01); *G06F 9/453* (2018.02);
(Continued)

(58) Field of Classification Search
CPC .......... G06K 9/00281; G06K 9/00248; G06K 9/4652; G06T 7/11; G06T 7/90; G06T 2207/30201; G06F 9/453; A45D 44/005
(Continued)

(56) References Cited

U.S. PATENT DOCUMENTS

| 5,680,481 A * | 10/1997 | Prasad | G06K 9/00281 |
| | | | 382/190 |
| 2007/0035815 A1* | 2/2007 | Edgar | A61B 5/0064 |
| | | | 359/359 |

(Continued)

FOREIGN PATENT DOCUMENTS

| JP | 2007175384 A | 7/2007 |
| JP | 2009213751 A | 9/2009 |

(Continued)

OTHER PUBLICATIONS

Office Action dated Mar. 5, 2019 of the corresponding Japan patent application.

(Continued)

*Primary Examiner* — Jerome Grant, II
(74) *Attorney, Agent, or Firm* — Chun-Ming Shih; HDLS IPR Services

(57) ABSTRACT

A foundation analysis method adopted by a body information analysis apparatus (1) includes following steps: performing positioning for each part of a face after the face is recognized by an image recognition module (12) of the apparatus (1); obtaining positions of at least a left eye (53), a right eye (54), and a nose (52) after positioning; determining a position of a left foundation (81) according to the left eye (53) and the nose (52); determining another position of a right foundation (82) according to the right eye (54) and the nose (52); analyzing average color values of the two foundations (81,82); comparing two average color values of the two foundations (81,82) with default color values or comparing the two average color values with each other; displaying a comparison result at a display module (111) of the apparatus (1); and, re-executing above steps before an assisting function is terminated.

12 Claims, 13 Drawing Sheets

(51) Int. Cl.
*G06K 9/46* (2006.01)
*A45D 44/00* (2006.01)
*G06F 9/451* (2018.01)
*G06T 7/11* (2017.01)

(52) U.S. Cl.
CPC ....... *G06K 9/00248* (2013.01); *G06K 9/4652* (2013.01); *G06T 7/11* (2017.01); *G06T 7/90* (2017.01); *G06T 2207/30201* (2013.01)

(58) Field of Classification Search
USPC ........................................................ 382/118
See application file for complete search history.

(56) References Cited

U.S. PATENT DOCUMENTS

| | | | |
|---|---|---|---|
| 2010/0142755 A1* | 6/2010 | Brandewie | A45D 44/005 382/100 |
| 2011/0164263 A1* | 7/2011 | Samain | A45D 44/005 358/1.9 |
| 2013/0169827 A1* | 7/2013 | Santos | H04N 5/23229 348/207.1 |
| 2013/0300761 A1* | 11/2013 | Ahmed | G01J 3/463 345/595 |
| 2015/0050624 A1* | 2/2015 | Yamanashi | A45D 44/00 434/100 |
| 2015/0145882 A1* | 5/2015 | Nguyen | H04N 1/622 345/589 |
| 2015/0254501 A1* | 9/2015 | Yamanashi | G06K 9/00268 348/78 |
| 2016/0357578 A1 | 12/2016 | Kim et al. | |
| 2017/0178220 A1* | 6/2017 | Chong | G06Q 30/0631 |
| 2017/0256084 A1* | 9/2017 | Iglehart | G06K 9/00221 |
| 2017/0348982 A1* | 12/2017 | Wong | A45D 33/02 |
| 2018/0376072 A1* | 12/2018 | Kwon | H04N 5/23222 |

FOREIGN PATENT DOCUMENTS

| | | |
|---|---|---|
| JP | 2012095730 A | 5/2012 |
| JP | 2014149696 A | 8/2014 |
| JP | 5656603 B2 | 1/2015 |
| JP | 2015072697 A | 4/2015 |
| JP | 6055160 B1 | 12/2016 |
| WO | 2013084233 A1 | 6/2013 |

OTHER PUBLICATIONS

Search Report dated Nov. 9, 2018 of the corresponding European patent application.
Office Action dated Jun. 11, 2019 of the corresponding Korean patent application.

* cited by examiner

BODY INFORMATION ANALYSIS APPARATUS AND FOUNDATION ANALYSIS METHOD THEREFOR

BACKGROUND OF THE INVENTION

1. Technical Field

The technical field relates to an analysis apparatus and an analysis method, and specifically relates to a body information analysis apparatus and a foundation analysis method thereof.

2. Description of Related Art

Applying cosmetics is an important one of multiple routine jobs for women.

Generally, a user usually sits in front of the mirror for applying cosmetics, or uses apparatuses having the camera and the monitor (such as smart phones, tablets, etc.) to substitute the traditional mirror for applying cosmetics.

However, the user can only check and confirm whether the makeup is done evenly or the color is appropriated or not by his/her bare eyes, that's why some users with less experiences may face the problem in slow makeup speed or terrible makeup quality.

According to the problem, users in this technical field seriously need an auxiliary apparatus, which may assist the users to apply cosmetics quickly and also to optimize the quality of the makeup.

SUMMARY OF THE INVENTION

The invention is directed to a body information analysis apparatus and a foundation analysis method thereof, which may analyze an image of foundations of the user and guide the user when the user is applying cosmetics, so as to assist the user to apply cosmetics more quickly and accurately.

In one of the exemplary embodiments of the present invention, the foundation analysis method includes following steps of: performing positioning actions to each facial feature of a face once the face is recognized from the external image by an image capturing module of the body information analysis apparatus; obtaining positions of a left eye, a right eye, and a nose respectively; determining a position of a left foundation according to the positions of the left eye and the nose, and determining another position of a right foundation according to the positions of the right eye and the nose; analyzing average color values of the left foundation and the right foundation; comparing the average color values with default color values, or comparing one of the average color values of the left foundation with another one of the average color values of the right foundation; displaying a comparison result through a display module of the body information analysis apparatus; and, re-executing above steps before the auxiliary action is completed.

In one of the exemplary embodiments of the present invention, the body information analysis apparatus at least includes an image capturing module, a display module, and a processor, wherein the image capturing module is used to capture an external image, and the processor is used to recognize the external image. When the processor recognizes a face from the external image, it performs positioning actions to each facial feature of the face for obtaining positions of a left eye, a right eye, and a nose. Besides, the processor determines a position of a left foundation according to the positions of the left eye and the nose and determines another position of a right foundation according to the positions of the right eye and the nose. Next, the processor analyzes average color values of the left foundation and the right foundation respectively, and compares the average color values with default color values, or compares one of the average color values of the left foundation with another one of the average color values of the right foundation for generating a comparison result, wherein the display module is used to display the comparison result.

In comparison with related art, each embodiment disclosed in the present invention may provide a face look for the user when he or she is applying cosmetics through the body information analysis apparatus, and the user may receive an image analysis upon his or her foundations, so as to apply cosmetics more quickly and accurately.

DETAILED DESCRIPTION OF THE INVENTION

In cooperation with the attached drawings, the technical contents and detailed description of the present invention are described thereinafter according to multiple embodiments, being not used to limit its executing scope. Any equivalent variation and modification made according to appended claims is all covered by the claims claimed by the present invention.

The present invention discloses a body information analysis apparatus (referred to as the analysis apparatus hereinafter). The analysis apparatus is used to perform a foundation analysis method (referred to as the analysis method hereinafter), which assists a user in making up foundations on his or her own face more quickly and accurately.

Figure 1:
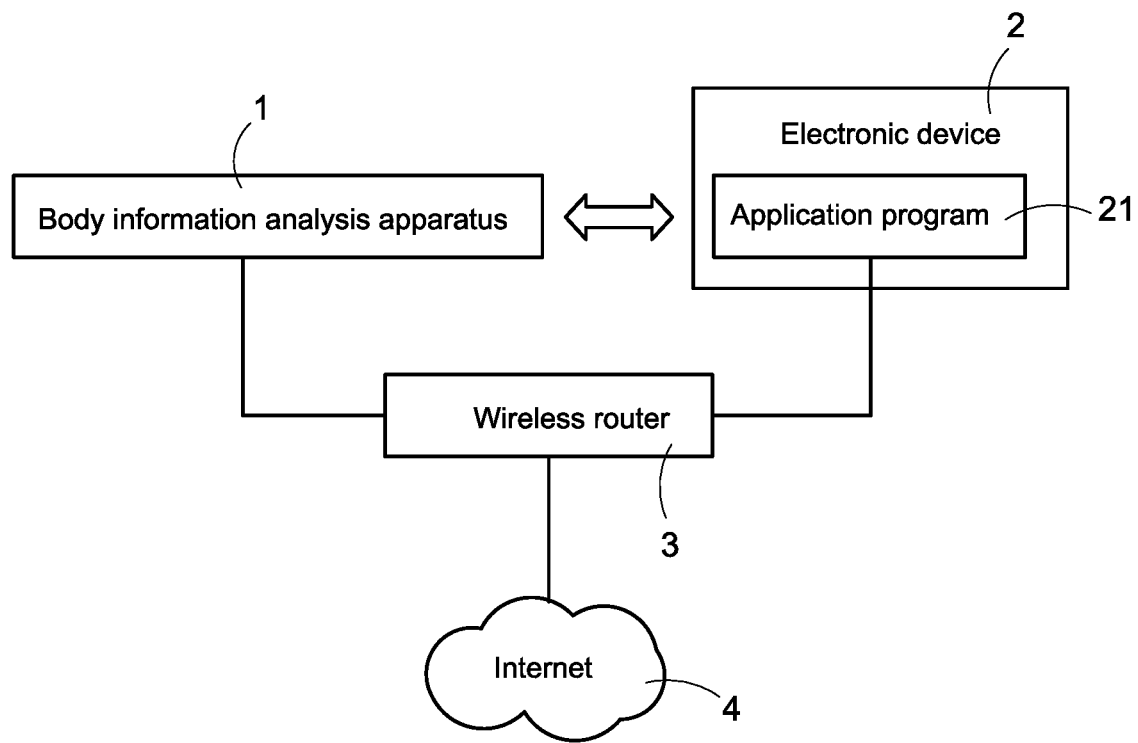
FIG. 1 is a schematic diagram of a system according to a first embodiment of the present invention.

FIG. 1 is a schematic diagram of a system according to a first embodiment of the present invention. In one embodiment, the user may perform setting on an analysis apparatus 1 through operating an electronic device 2. As shown in FIG. 1, the electronic device 2 is installed with an application program 21. In particular, the application program 21 may interconnect with the analysis apparatus 1 (for example, the application program 21 may be an application program created and provided by the manufacturer of the analysis apparatus 1). In the present invention, a user may operate the application program 21 executed by the electronic device 2 for completing multiple setting actions on the analysis apparatus 1 (such as registering face information, setting default values, etc.).

In one embodiment, the analysis apparatus 1 and the electronic device 2 are connecting to same wireless router 3 within the arranged area, and they can establish a wireless connection with each other or to the Internet 4 through the wireless router 3. Therefore, the analysis apparatus 1 may perform firmware updating, data uploading, data downloading, etc. through the Internet 4. Besides, the analysis apparatus 1 may collect user's body information and transmit the body information to a remote computer (not shown) through the Internet 4. Therefore, the user may check the body information from a remote end, and an offsite backup purpose may also be accomplished.

Moreover, the analysis apparatus 1 and the electronic device 2 may pair or connect directly through other wireless communication protocols (e.g., Bluetooth pairing, Zigbee connecting, RF connection, etc.), so as to transmit data, commands and signals with each other.

Figure 2:
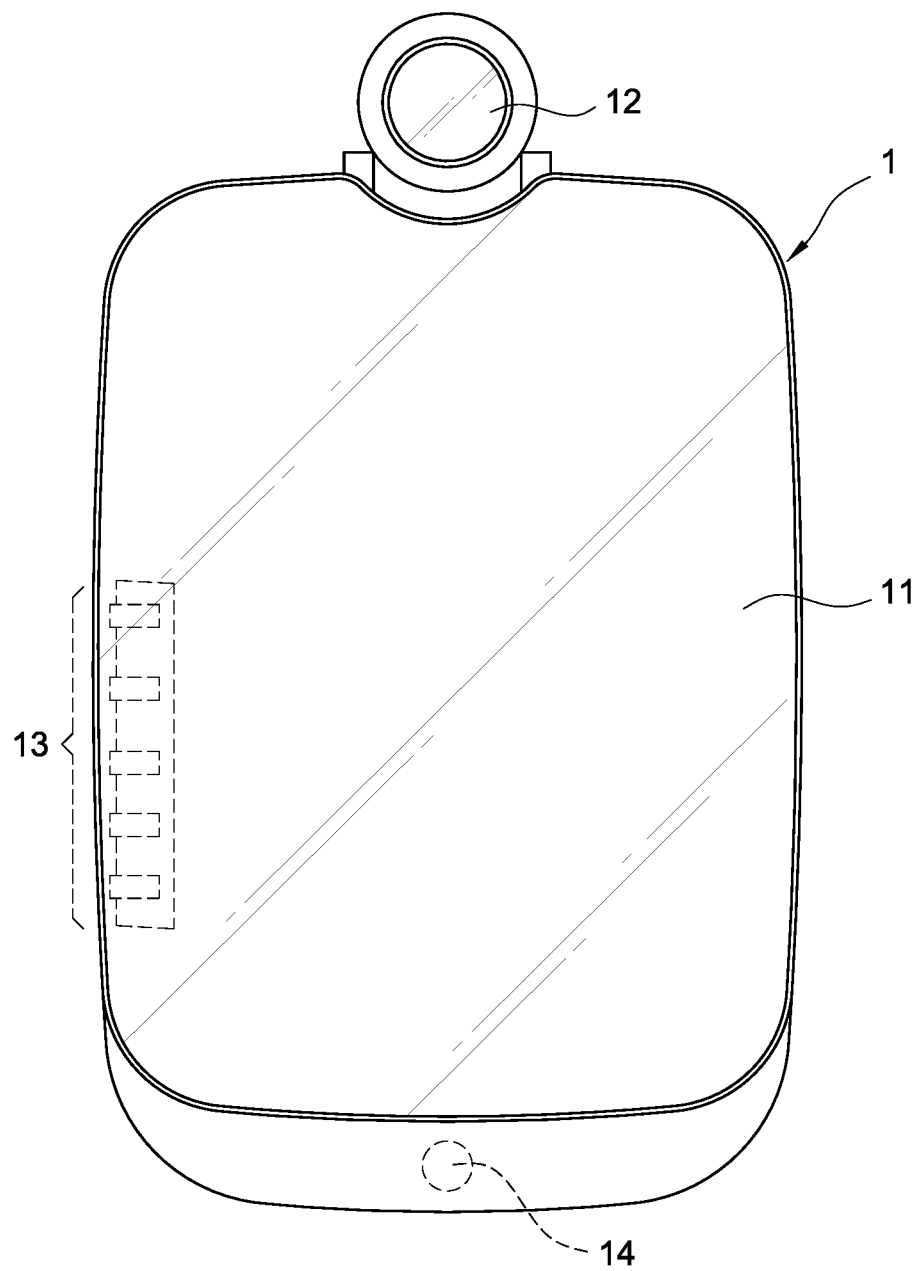
FIG. 2 is a schematic diagram of an analysis apparatus according to a first embodiment of the present invention.
Figure 3:
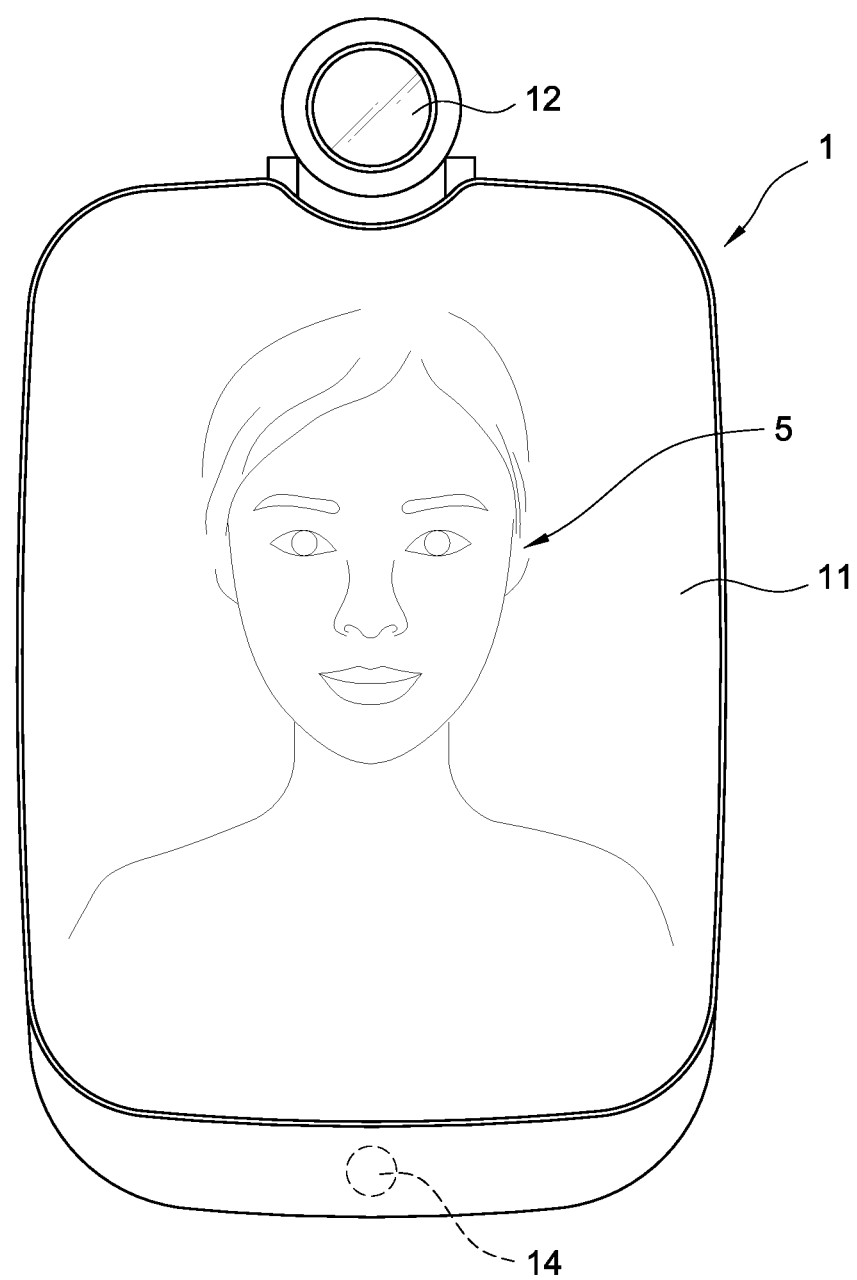
FIG. 3 is a schematic diagram of the analysis apparatus according to a second embodiment of the present invention.

Refers to FIG. 2 and FIG. 3, wherein FIG. 2 is a schematic diagram of an analysis apparatus according to a first embodiment of the present invention, and FIG. 3 is a schematic diagram of the analysis apparatus according to a second embodiment of the present invention. The analysis apparatus 1 in the present invention is basically arranged in the bedroom or the restroom of a user 5 and is used to inspect and analyze user's body information (e.g., the skin situation of the face, the neck, or the hands, etc.), so as to assist the user to apply cosmetics.

The analysis apparatus 1 includes a mirror screen 11. The analysis apparatus 1 displays a graphical user interface (GUI) through the mirror screen 11 for interacting with the user 5 while it is turned on. When the analysis apparatus 1 is turned off, the mirror screen 11 can also be deemed and used as a regular mirror for reflecting the face look of the user 5. One of the main objectives of the present invention is to assist the user 5 in applying cosmetics through the analysis apparatus 1. For doing so, the mirror screen 11 may simultaneously reflect the face look of the user 5 and display the GUI. Therefore, the analysis apparatus 1 may analyze the make-up of the user 5 while the user 5 is applying cosmetics for providing assistances to the user 5 (detailed described in the following).

In one embodiment, the mirror screen 11 may be a touch screen, and the user 5 may perform data input on the analysis apparatus 1 through the mirror screen 11.

The analysis apparatus 1 further includes an image capturing module 12, which is arranged on the analysis apparatus 1 and is adjustable for its setting angle. In one embodiment, the image capturing module 12 may capture high-resolution images for the user 5 (such as face images, neck images, hands images, etc.). Therefore, the analysis apparatus 1 may analyze body information and make-up progress of the user 5 through the captured images. In another embodiment, the image capturing module 12 may capture external messages (such as barcodes, QR codes, etc.), and the analysis apparatus 1 may obtain necessary data according to the content of the captured external messages.

The analysis apparatus 1 further includes multiple buttons 13. In one embodiment, the multiple buttons 13 may be physical buttons or touch keys, not limited thereto. The user 5 may operate the GUI (for example, controls the GUI to go back to a home page, to perform a pageup function, to perform a pagedown function, etc.), or leads the analysis apparatus 1 to quickly trigger corresponding functions (for example, turns on the mirror screen 11, turns off the mirror screen 11, turns on the image capturing module 12, etc.), by way of pressing the buttons 13.

The analysis apparatus 1 further includes one or more sensors 14 (such as temperature sensors, humility sensors, etc.). The sensors 14 are used to detect the environment values around the position where the analysis apparatus 1 is arranged. Therefore, the accuracy of the body information of the user 5 detected and analyzed by the analysis apparatus 1 may be enhanced in accordance with the sensor data. For an instance, if the sensors 14 comprise a pyroelectric infrared radial (PIR) sensor, it can detect whether the user 5 is entering the field of usage of the analysis apparatus 1 in any time. Therefore, the analysis apparatus 1 may leave the standby mode correspondingly for activating the image capturing module 12 for capturing the face image of the user 5 and performing the following analysis processes.

In another embodiment, the above sensors 14 may include a motion sensor. The analysis apparatus 1 may detect user's moving gesture (such as waving left, waving right, waving up, waving down, pushing forward, pulling backward, etc.) through the motion sensor. Therefore, the user 5 may perform data input on the analysis apparatus 1 through the moving gestures without physically touching the aforementioned mirror screen 11 or the buttons 13, so as to prevent the mirror screen 11 and the buttons 13 from retaining fingerprints.

Figure 4:
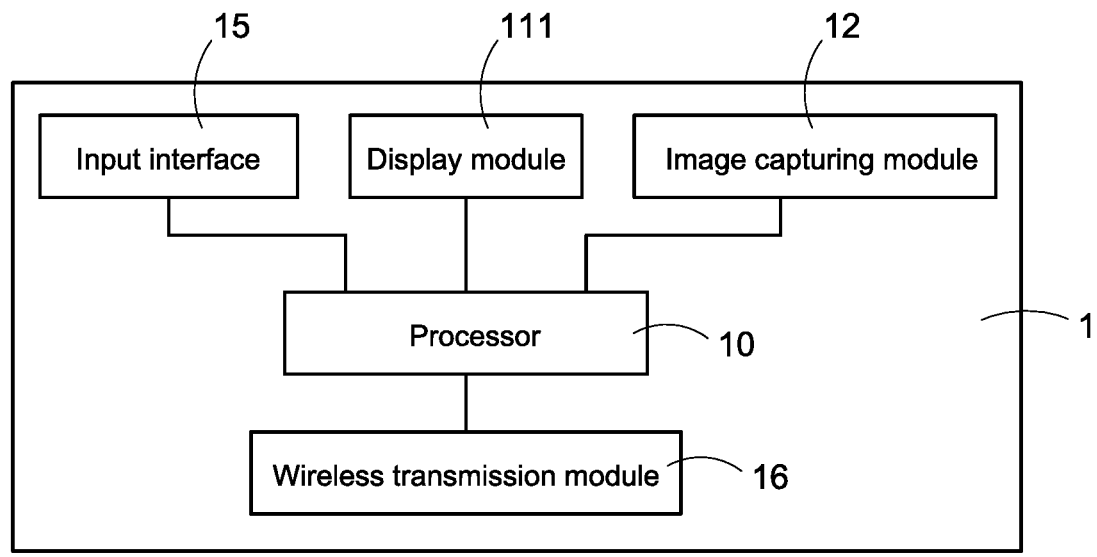
FIG. 4 is a block diagram of the analysis apparatus according to a third embodiment of the present invention.

FIG. 4 is a block diagram of the analysis apparatus according to a third embodiment of the present invention. As shown in FIG. 4, the analysis apparatus 1 mainly includes a processor 10, a display module 111, the image capturing module 12, an input interface 15, and a wireless transmission module 16, wherein the display module 111, the image capturing module 12, the input interface 15, and the wireless transmission module 16 are electrically connected with the processor 10.

In one embodiment, the image capturing module 12 may be a camera. The image capturing module 12 is used to capture external images and messages and provides the captured images and the captured messages to the analysis apparatus 1. The analysis apparatus 1 may perform recognitions on the user 5 through the captured images (for example, a face recognition, a neck recognition, a hand recognition, etc.) so as to analyze each feature of the user 5 (such as the face, the neck, the hand, etc.). Also, the analysis apparatus 1 may also perform relative settings through the content of the captured messages.

The display module 111 is used to display the aforementioned GUI. In one embodiment, the display module 111 is arranged inside the mirror screen 11. When the display module 111 is turned on, the light emitted from the display module 111 may penetrate through the mirror screen 11 and the GUI may be displayed right on the mirror screen 11. When the display module 111 is turned off, the user may regard and use the mirror screen 11 as a regular mirror. In one embodiment, the analysis apparatus 1 may adjust the light strength or the display area of the display module 111, thus the mirror screen 11 may simultaneously reflect the image of the user and also display the GUI thereon.

The analysis apparatus 1 may receive external input through the input interface 15, so the user may interact with the GUI or perform necessary settings on the analysis apparatus 1. In one embodiment, the input interface 15 may be the aforementioned sensors 14, so as to detect the gesture inputs from the user. In another embodiment, the input interface 15 may be the image capturing module 12, so as to capture the external images or the external messages. In a further embodiment, the input interface 15 may be the touch screen or the buttons 13, so as to receive input actions directly from the user. In another further embodiment, the input interface 15 may be a microphone, so as to receive external audio.

The wireless transmission module 16 assists the analysis apparatus 1 to connect to the Internet 4. In particular, the user may connect to the analysis apparatus 1 from a remote end through the Internet 4 to check each information recorded in the analysis apparatus 1 (such as the body information of the user) in any time.

The processor 10 is connected to the display module 111, the image capturing module 12, the input interface 15, and the wireless transmission module 16, and the processor 10 may include computer executable program codes (not shown). Upon executing the computer executable program codes, the processor 10 may control all the above modules of the analysis apparatus 1 and performs the analysis method of the present invention.

Figure 5:
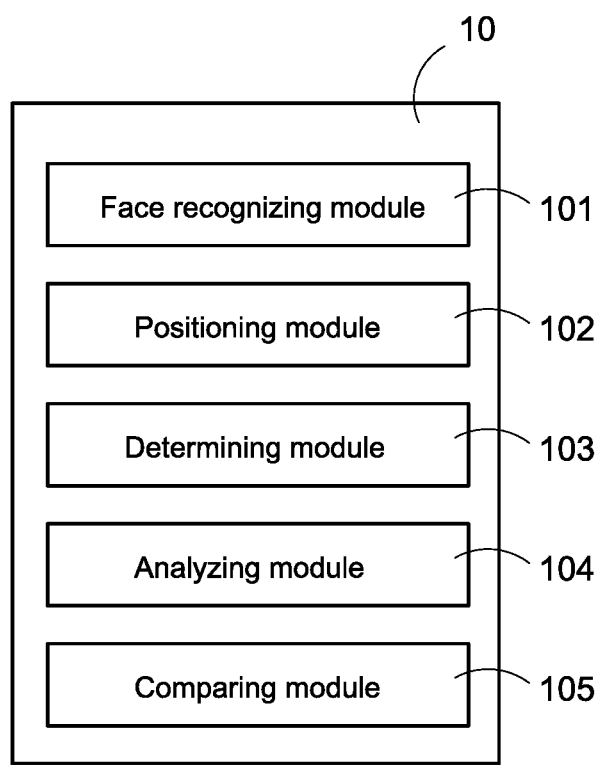
FIG. 5 is a schematic diagram of a processor according to a first embodiment of the present invention.

Refers to FIG. 5, which is a schematic diagram of a processor according to a first embodiment of the present invention. In particular, the processor 10 accomplishes each function of the analysis method of the present invention through executing the aforementioned computer executable program codes, and the computer executable program codes may be divided into multiple function modules set forth below according to different functions:

1. A face recognizing module 101, which is used to recognize the external image captured by the image capturing module 12, so as to determine whether a face is present in the external image;

2. A positioning module 102, which is used to perform positioning actions on the face presented in the external image through an algorithm, so as to obtain the positions of each facial feature of the face (for example, eyebrows, eyes, the nose, the mouth, etc.);

3. A determining module 103, which is used to find suitable positions on the face for the user to apply foundations according to the positions obtained by the positioning module 102;

4. An analysing module 104, which is used to execute image analysis to the aforementioned foundation positions, so as to obtain the current condition of the foundations of the user (such as the color brightness of the foundations, the color distribution of the foundations, etc.); and 5. A comparing module 105, which is used to compare the conditions of the current foundations with default values, and informs the user about the comparison result (e.g., the color is too bright, the color is too dark, the color distribution is uneven, etc.), so as to provide make-up assistances for the user.

In other embodiment, the comparing module 105 may compare the condition of the current left foundation with the condition of the current right foundation of the user, and informs the user about the comparison result (e.g., the color of the left foundation is brighter than that of the right foundation, the color of the right foundation is darker than that of the left foundation, etc.), instead of comparing the current condition of the two sides foundations with the default values. In other words, the comparison module 105 in this embodiment may use the condition of the right foundation as the default value in real-time to compare with the condition of the left foundation, and may use the condition of the left foundation as the default value in real-time to compare with the condition of the right foundation alternatively.

Figure 6A:
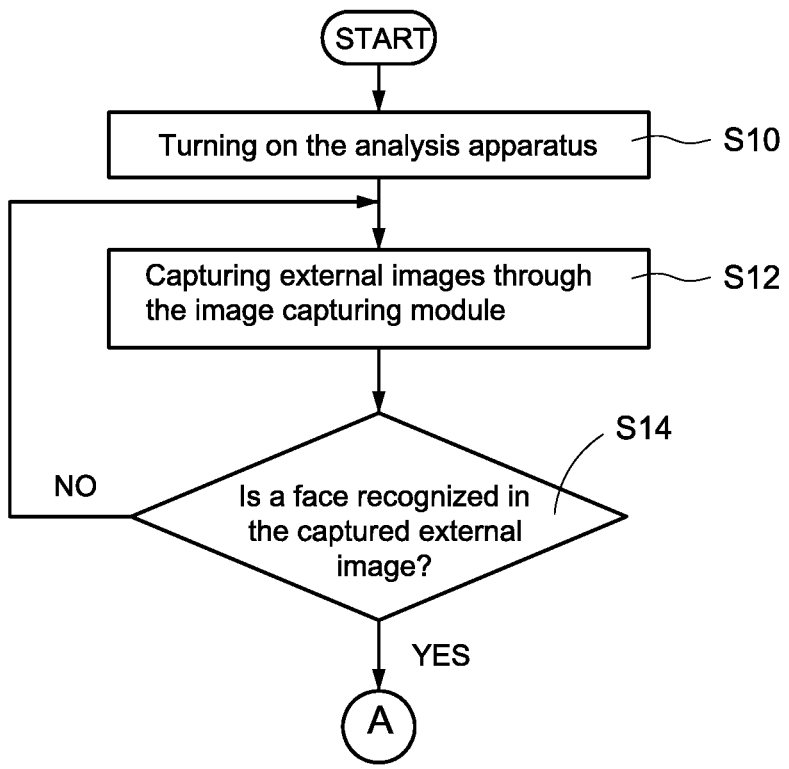
FIG. 6A is a first flowchart for analyzing the foundations according to a first embodiment of the present invention.
Figure 6B:
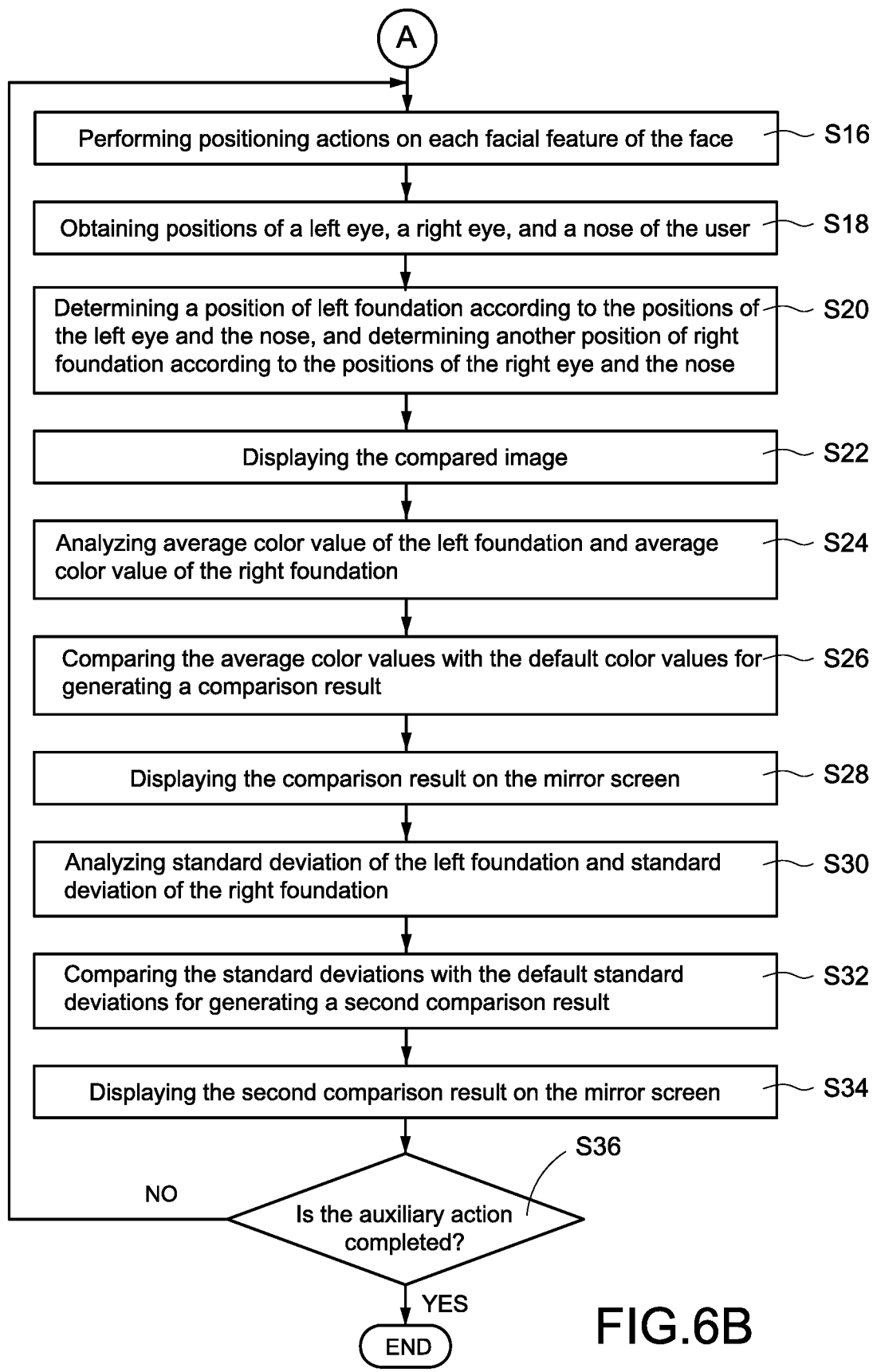
FIG. 6B is a second flowchart for analyzing the foundations according to the first embodiment of the present invention.

FIG. 6A is a first flowchart for analyzing the foundations according to a first embodiment of the present invention. FIG. 6B is a second flowchart for analyzing the foundations according to the first embodiment of the present invention. FIG. 6A and FIG. 6B are used to describe steps of the analysis method of the present invention, and these steps are in particular adopted by the analysis apparatus 1 as shown in FIG. 1 to FIG. 5. More specific, the analysis apparatus 1 executes aforementioned computer executable program codes (i.e., the above function modules 101-105) through the processor 10 for accomplishing each step as described in the following.

As shown in FIG. 6A, to perform the analysis method through the analysis apparatus 1 of the present invention for assisting the user in applying cosmetics, the user first turns the analysis apparatus 1 on (step S10). In one embodiment, the user may trigger the touch screen or the buttons 13 to turn the analysis apparatus 1 on. In another embodiment, the analysis apparatus 1 may automatically enter a standby mode after receiving power, and the user may input gestures through the image capturing module 12 or the sensors 14 for activating the analysis apparatus 1 from the standby mode, but not limited thereto.

In particular, the analysis apparatus 1 may include multiple modes capable of different functions. In one embodiment, the analysis apparatus 1 is automatically entering an auxiliary mode for assisting the user in applying cosmetics after it is turned on. In another embodiment, the analysis apparatus 1 may automatically enter the standby mode after it is turned on, and enters the auxiliary mode after receiving the corresponding command from the user.

After being turned on, the analysis apparatus 1 keeps capturing external images through the image capturing module 12 (step S12), and the processor 10 of the analysis apparatus 1 keeps determining whether a face is present in the captured external images (step S14). In one embodiment, the processor 10 obtains an external image from the image obtaining module 12, and performs a face recognition on the external image through the face recognizing module 101, so as to determine whether a face is present in the external image or not.

If no face is present in the external image, the analysis apparatus 1 re-executes the step S12 and the step S14 for continually capturing and analyzing external images. For example, if only a bed, a door, or a chair is present in the external image (means there's no human exists in the bedroom), or only the body or the back of the user is present in the external image (means the user doesn't want to use the analysis apparatus 1), the analysis apparatus 1 will not perform the analysis method of the present invention.

As shown in FIG. 6B, if the processor 10 determines that a face is present in the external image after recognition, it then performs positioning actions on each part (basically on each facial feature) of the face (step S16). In one embodiment, the processor 10 may further determine if the size of the face is larger than a specific ratio or not (for example, the face occupies the external image more than 40%) after the face is determined present in the external image. In this scenario, the process 10 performs the positioning actions on each facial feature of the face only if the size of the face in the external image is larger than the specific ratio.

In one embodiment, the processor 10 renders the face image to the aforementioned positioning module 102 after determining the face is present in the external image, so the positioning module 102 may perform the positioning actions on the face image and then obtain at least the positions of a left eye, a right eye, and a nose of the user from the face image (step S18).

It should be noted that the positioning module 102 in the embodiment may perform the positioning actions on each facial feature of the face through a Dlib Face Landmark system, but not limited thereto.

Figure 7:
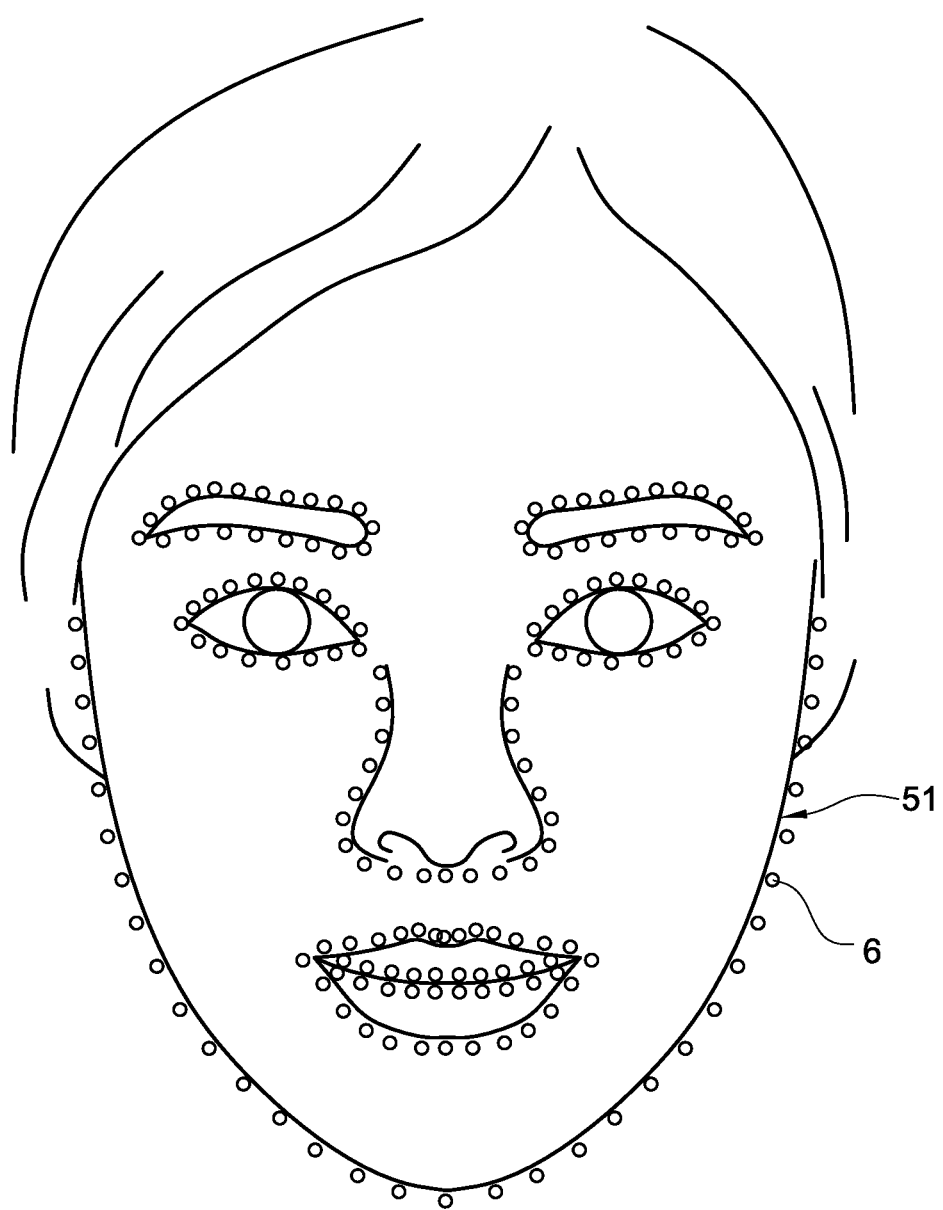
FIG. 7 is a schematic diagram for positioning a face.

FIG. 7 is a schematic diagram for positioning a face. When determining that a face is present in the external image, the processor 10 further performs analysis on the image of a face 51 through the Dlib Face Landmark system. The Dlib Face Landmark system is a common technical solution in the technical field, which can generate multiple positioning points 6 in the image of the face 51 after completing the analysis (such as 198 positioning points). Therefore, the Dlib Face Landmark system may figure out the positions of each facial feature of the face 51 according to the serial number, the shape, the order, etc. of the multiple positioning points 6 for accomplishing the positioning actions.

Refer back to FIG. 6B, the processor 10 may at least obtain the positions of the left eye, the right eye, and the nose of the user after the step S18. Next, the processor 10 may determine a position of a left foundation according to the positions of the left eye and the nose, and also another position of a right foundation according to the positions of the right eye and the nose (step S20). In one embodiment, the processor 10 is rendering a positioning result of the Dlib Face Landmark system to the aforementioned determining module 103, so the determining module 103 may calculate the positions of the left foundation and the right foundation respectively according to the positions of the left eye, the right eye, and the nose.

It should be noted that one of multiple objectives of the present invention is to assist the user in applying foundations, so the analysis apparatus 1 may control the display module 111 to optionally display the calculated positions of the left foundation and right foundation. In particular, the display module 111 may directly display the positions of the left foundation and the right foundation on the mirror screen 11 (for example, indicates the foundation positions through colored boxes), and makes the indicated foundation positions overlap the reflect image of the face 51 of the user right on the mirror screen 11. Therefore, the user may check and ensure the suitable positions upon the face for making up the foundations right through the mirror screen 11.

In the embodiment, the processor 10 may pre-store default images for being compared with the foundations of the user, so as to determine the condition of the current foundations of the user. In this embodiment, the analysis apparatus 1 may control the display module 111 to optionally display one of the default compared images adopted by the processor 10 (step S22). In this embodiment, the compared images may be, for example, augmented reality (AR) images pre-stored in the analysis apparatus 1, but not limited thereto.

In another embodiment, the user may select specific foundation products (such as specific brands or specific models) or specific foundation effects pre-stored in the analysis apparatus 1. Otherwise, the user may input one or more desired foundation products to the analysis apparatus 1 for the analysis apparatus 1 to generate corresponding effect automatically. The aforementioned AR images may be generated by the analysis apparatus 1 through combining the user image captured by the image capturing module 12 with the effect selected by the user in advance and overlapped onto the foundation positions of the user image. Otherwise, the user may store the corresponding effect and/or the AR images to the analysis apparatus 1 if the selected effect satisfies the user.

In another embodiment, the analysis apparatus 1 may be embedded with multiple AR images while it's produced, and the user may select one of the multiple AR images as the aforementioned compared image through the input interface 15. Besides, the user may input favorite compared image(s) to the analysis apparatus 1 through I/O devices or through the Internet 4, so the processor 10 may perform aforementioned comparing actions based on the user preferred compared images. In this embodiment, the compared images are face images, which respectively indicate partial facial features at least including the left eye, the right eye, and the nose.

It should be mentioned that the analysis apparatus 1 may pre-store multiple default values (such as default color values described in the following) directly for being compared. Under this circumstance, the analysis apparatus 1 is unnecessary to store the aforementioned compared images, which means the above step S22 may be omitted.

Next, the process 10 analyzes an average color value of the left foundation and another average color value of the right foundation according to the images of the left foundation and the right foundation (step S24). In one embodiment, the processor 10 respectively renders the image of the left foundation and also the image of the right foundation to the aforementioned analyzing module 104, so the analyzing module 104 may analyze the average color values of the left foundation and the right foundation according to the rendered images. In this embodiment, the analyzing module 104 may apply multiple image analyzing algorithms of the related art for analyzing the average color values of the left foundation and the right foundation according to the images of the left foundation and the right foundation.

In particular, the calculation of the above average color values may be performed by the processor 10 through analyzing and indicating the obtained foundation images by different color space formats. The above color space formats may be RGB color space, HSV color space, HSL color space, etc., not limited thereto. According to the analysis method adopted by the processor 10, the processor 10 may use two or more color space formats simultaneously, or may take a measure of weight therefrom for analyzing.

For example, if the adopted color space format is the HSV color space, the color of each pixel of the obtained foundation images may be indicated by multiple measures of weight including "Hue", "Saturation", and "Value". If the adopted color space format is the RGB color space, the color of each pixel of the obtained foundation images may be indicated by multiple measures of weight including "Red", "Green", and "Blue".

After the step S24, the processor 10 may obtain the default color values, and compares the average color values with the default color values for generating a comparison result (step S26).

In one embodiment, the processor 10 analyzes the aforementioned compared images (i.e., the AR images) through the positioning module 102, the determining module 103, and the analyzing module 104 for obtaining the default color values. In another embodiment, the processor 10 pre-stores the default color values by the comparing module 105 directly and thus the storing action, the selecting action, and the analyzing action to the aforementioned compared images are omitted. The processor 10 may render the average color values to the comparing module 105 after the step S24, so the comparing module 105 may compare the average color value of the left foundation with one of the default color values for generating a comparison result, and may compare the average color value of the right foundation with another one of the default color values for generating another comparison result.

The aforementioned default color values may be standard colors or standard brightness. In one embodiment, the default color values are obtained by the processor 10 via analyzing the compared images, and the above standard colors and standard brightness are the colors and the brightness according to the face image of the compared images. In another embodiment, the default color values are pre-stored in the analysis apparatus 1, the above standard colors and standard brightness are the ideal colors and ideal brightness pre-set by the user. In a further embodiment, the analysis apparatus 1 may download user preferred make-up through the Internet 4, and the analysis apparatus 1 may perform image analyzing on the downloaded make-up for generating and storing the default color values.

It should be noted that the processor 10 in the step S26 is to compare the average color values of both the left foundation and the right foundation with the default color values respectively. In another embodiment, the processor 10 may compare the average color value of the left foundation with another average color value of the right foundation for generating the above comparison result. Under this circumstance, the processor 10 is to simply determine whether the conditions of the left foundation and the right foundation are similar (for example, whether the colors or the brightness of the two sides foundations are similar or not), thus the default color values are unnecessary.

In the other words, the comparing module 105 in the step S26 may obtain the average color value of the right foundation in real-time for being the aforementioned default color value (such as a first default color value), and compares the average color value of the left foundation with the first default color value. Besides, the comparing module 105 may obtain the average color value of the left foundation in real-time for being the aforementioned default color value (such as a second default color value), and compares the average color value of the right foundation with the second default color value. Finally, the comparing module 105 generates the comparison result accordingly. However, the above description is just an embodiment, not intended to narrow down the scope of the claims of the present invention.

After the step S26, the analysis apparatus 1 may display the comparison result on the mirror screen 11 through the display module 111 (step S28). The user may obtain the condition about the current foundations right on the mirror screen 11 (for example, the brightness of the foundations are higher than or lower than the standard brightness), so as to be served for assistances by the analysis apparatus 1.

In one embodiment, the average color values and the default color values mentioned above are pixel values within 0 to 255, the comparison result is a percentage, and the comparing module 105 generates the comparison result through executing the formula:

$$\frac{|\text{default color values} - \text{average color values}|}{255} * 100\%.$$

However, the above description is only an embodiment, not intended to narrow down the scope of claims of the present invention.

In one embodiment, the processor 10 further analyzes a standard deviation (SD) of the left foundation and another standard deviation of the right foundation according to the images of the left foundation and the right foundation (step S30). In one embodiment, the processor 10 renders the images of the left foundation and the right foundation to the analyzing module 104, so the analyzing module 104 may analyze the standard deviations of the left foundation and the right foundation accordingly. Similarly, the analyzing module 104 may apply multiple image analyzing algorithms of the related art to analyze the standard deviations of the left foundation and the right foundation according to the images of the left foundation and the right foundation.

After the step S30, the processor 10 may obtain pre-stored default standard deviations, and compares the above standard deviations with the default standard deviations for generating a second comparison result (step S32).

In one embodiment, the processor 10 may perform image analysis on the aforementioned compared image (such as the AR image) through the analyzing module 104 for obtaining the default standard deviations. Then, the processor 10 compares the above standard deviations of the left and right foundations with the default standard deviations through the comparing module 105 for generating the second comparison result.

In another embodiment, the processor 10 may pre-store the default standard deviations by the comparing module 105, and renders the standard deviations of the two sides foundations to the comparing module 105 after the step S30. The comparing module 105 may directly compare the standard deviations of the left and right foundations with the pre-stored default standard deviations for generating the second comparison result.

After the step S32, the analysis apparatus 1 may display the second comparison result on the mirror screen 11 through the display module 111 (step S34). The user may check whether the current foundations have uneven issues or not (for example, the color distribution of the foundations may lower than the standard color distribution), and proceeds with repairing actions to which are uneven.

It should be noted that the step S24 to the step S28, and the step S30 to the step S34, are not having an execution order. The analysis apparatus 1 may alternatively calculate and display the comparison result or the second comparison result first, or calculate and display both the comparison result and the second comparison result simultaneously through multiplex processing, it is not limited to the step order shown in FIG. 6B.

In one embodiment, the standard deviations are similar to the aforementioned average color values, which may be pixel values within 0 to 255. The second comparison result is similar to the aforementioned comparison result, which may be a percentage. In this embodiment, the comparing module 105 may generate the second comparison result through executing the formula:

$$\frac{|\text{default standard deviations} - \text{standard deviations}|}{255} * 100\%.$$

However, the above description is only one of the exemplary embodiments, not intended to narrow down the scope of the claims of the present invention.

Next, the analysis apparatus 1 determines whether the auxiliary actions provided for the user are completed (step S36). Before the auxiliary actions are completed, the analysis apparatus 1 re-executes the step S16 to the step S34 for continually recognizing the face 51 of the user, positioning the facial features of the face 51, obtaining the images and the positions of the left foundation and the right foundation, analyzing the average color values and the standard deviations of the foundations, and generating and displaying the comparison result and the second comparison result. Otherwise, once the auxiliary actions are all completed, the analysis apparatus 1 terminates the analysis method. Through re-executing the aforementioned step S16 to step S34, the analysis apparatus 1 and the analysis method of the present invention may accomplish a real-time make-up auxiliary function.

For an instance, the analysis apparatus 1 may perform analysis on the face 51 of the user, and display the comparison result for indicating that the color of the current left foundation of the user is 5% darker than the standard color. According to the comparison result, the user may repair the left foundation. In the middle of the repairing, the analysis apparatus 1 keeps analyzing the face 51 of the user, and it adjusts the comparison result for indicating that the color of the current left foundation of the user is now 3% darker than the standard color.

According to the adjusted comparison result, the user may keep repairing the left foundation. Still the analysis apparatus 1 keeps analyzing the face 51 of the user. Next, the analysis apparatus 1 again adjusts the comparison result for indicating that the color of the current left foundation of the user is now 1.5% darker than the standard color, and so on. Therefore, the user may keep repairing the foundations until the color/brightness of the foundations are identical or similar to the standard color/standard brightness.

In one embodiment, the analysis apparatus 1 in the step S36 is to determine whether the analysis apparatus 1 is turned off or not. In this embodiment, the analysis apparatus 1 may re-execute the step S16 to the step S34 before it is turned off, and the analysis apparatus 1 may terminate the analysis method after that. Therefore, the analysis apparatus 1 may keep providing the real-time make-up auxiliary function while it is on.

In one embodiment, the analysis apparatus 1 in the step S36 is to determine whether the comparison result (and the second comparison result) complies with a completion standard or not. For example, the analysis apparatus 1 may determine whether the above average color values are equal to or similar to the default color values according to the comparison result, and determines whether the above standard deviations are equal to or similar to the default standard deviations according to the second comparison result. Next, the analysis apparatus 1 may determine that the comparison result (and the second comparison result) complies with the completion standard once the average color values are equal to or similar to the default color values and the standard deviations are equal to or similar to the default standard deviations.

Similarly, the analysis apparatus 1 in this embodiment may re-execute the step S16 to the step S34 before the comparison result (and the second comparison result) complies with the completion standard, and may terminate the analysis method after that.

Figure 8A:
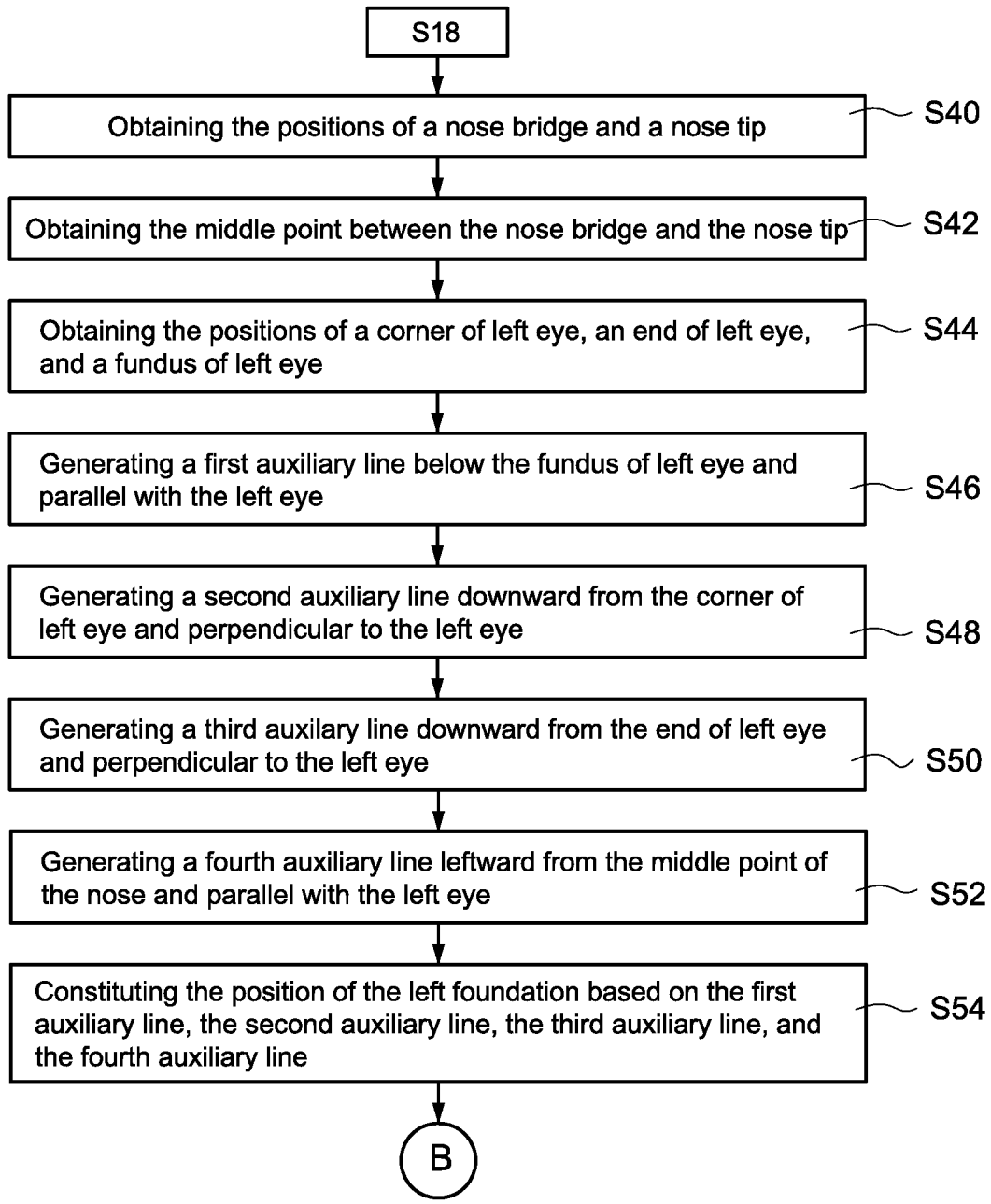
FIG. 8A is a first flowchart for analyzing the foundations according to a second embodiment of the present invention.
Figure 8B:
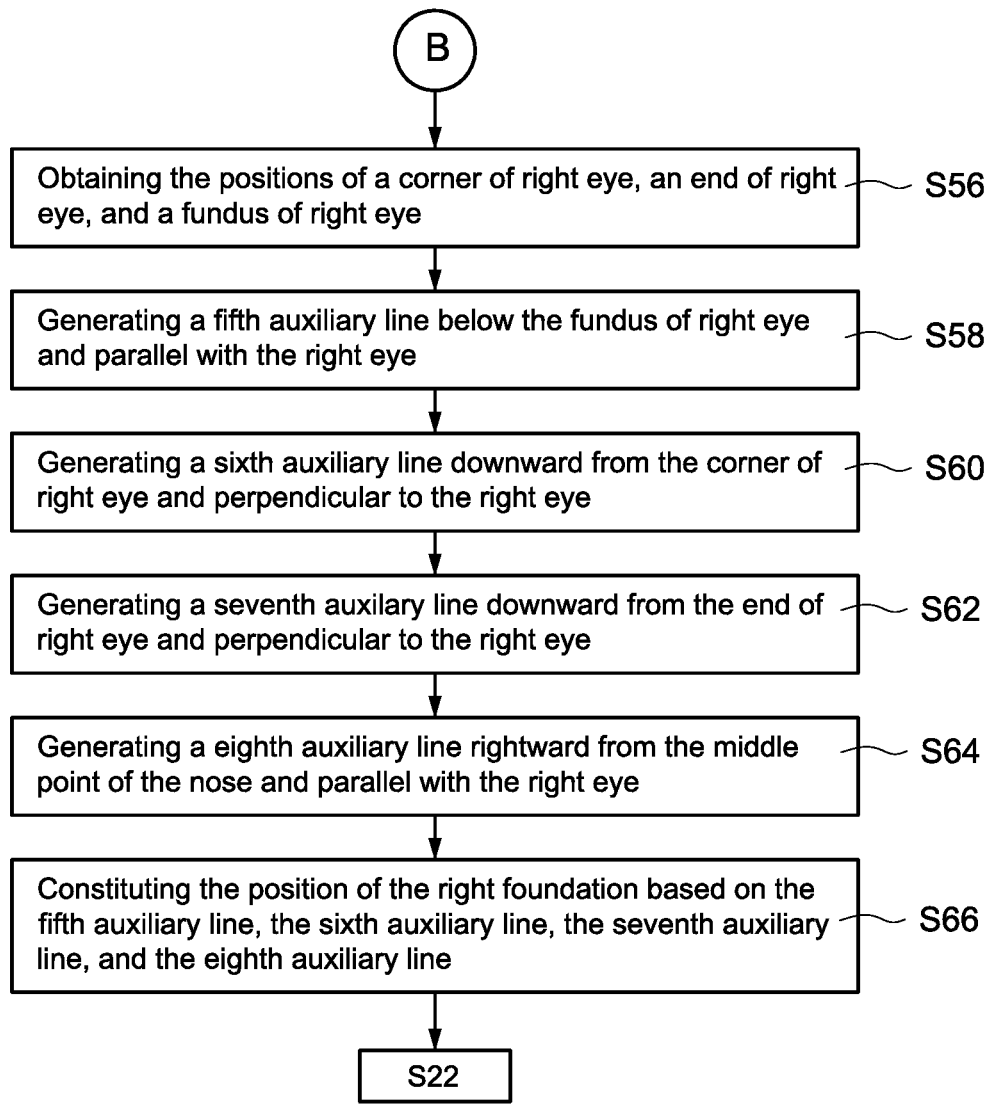
FIG. 8B is a second flowchart for analyzing the foundations according to the second embodiment of the present invention.

FIG. 8A is a first flowchart for analyzing the foundations according to a second embodiment of the present invention. FIG. 8B is a second flowchart for analyzing the foundations according to the second embodiment of the present invention. FIG. 8A and FIG. 8B are used to detailed describe the step S20 of FIG. 6B, so as to interpret how the determining module 103 of the processor 10 finds the foundation positions according to the positions of a left eye image, a right eye image, and a nose image of the image.

In particular, after the step S18 of FIG. 6B, the determining module 103 may obtain the positions of the left eye, the right eye, and the nose of the user. In one embodiment, the determining module 103 may alternatively determine the position of the left foundation or the position of the right foundation first. In another embodiment, the determining module 103 may determine the positions of both the left foundation and the right foundation simultaneously. Besides, the determining module 103 may generate necessary auxiliary lines in an arbitrary order after determining the positions of the foundations (detailed described in the following), i.e., steps S40 to S66 do not have a constant execution order. For the sake of understanding, the following descriptions will follow the order of the flowcharts shown in FIG. 8A and FIG. 8B, but not intended to narrow down the scope of the claims of the present invention.

First, the determining module 103 may obtain the positions of a nose bridge and a nose tip of the nose from the image of the face (step S40), and further obtains a middle point between the nose bridge and the nose tip (step S42).

Next, the determine module 103 may obtain the positions of a corner of left eye, an end of left eye, and a fundus of left eye from the image of the face (step S44). Next, the determining module 103 generates a first auxiliary line below the fundus of left eye and parallel with the left eye (step S46), and generates a second auxiliary line downward from the corner of left eye and perpendicular to the left eye (step S48), and generates a third auxiliary line downward from the end of left eye and perpendicular to the left eye (step S50). Further, the determining module 103 generates a fourth auxiliary line leftward from the middle point of the nose and parallel with the left eye (step S52). Lastly, the determining module 103 may constitute the position of the left foundation based on the first auxiliary line, the second auxiliary line, the third auxiliary line, and the fourth auxiliary line (step S54).

On the other hand, the determining module 103 may obtain the positions of a corner of right eye, an end of right eye, and a fundus of right eye from the image of the face (step S56). Next, the determining module 103 generates a fifth auxiliary line below the fundus of right eye and parallel with the right eye (step S58), and generates a sixth auxiliary line downward from the corner of right eye and perpendicular to the right eye (step S60), and generates a seventh auxiliary line downward from the end of right eye and perpendicular to the right eye (step S62). Further, the determining module 103 generates a eighth auxiliary line rightward from the middle point of the nose and parallel with the right eye (step S64). Lastly, the determining module 103 may constitute the position of the right foundation based on the fifth auxiliary line, the sixth auxiliary line, the seventh auxiliary line, and the eighth auxiliary line (step S66).

In one embodiment, the analysis apparatus 1 may optionally control the display module 111 to display the aforementioned first auxiliary line to the eighth auxiliary line on the mirror screen 11 for being checked by the user.

Figure 9A:
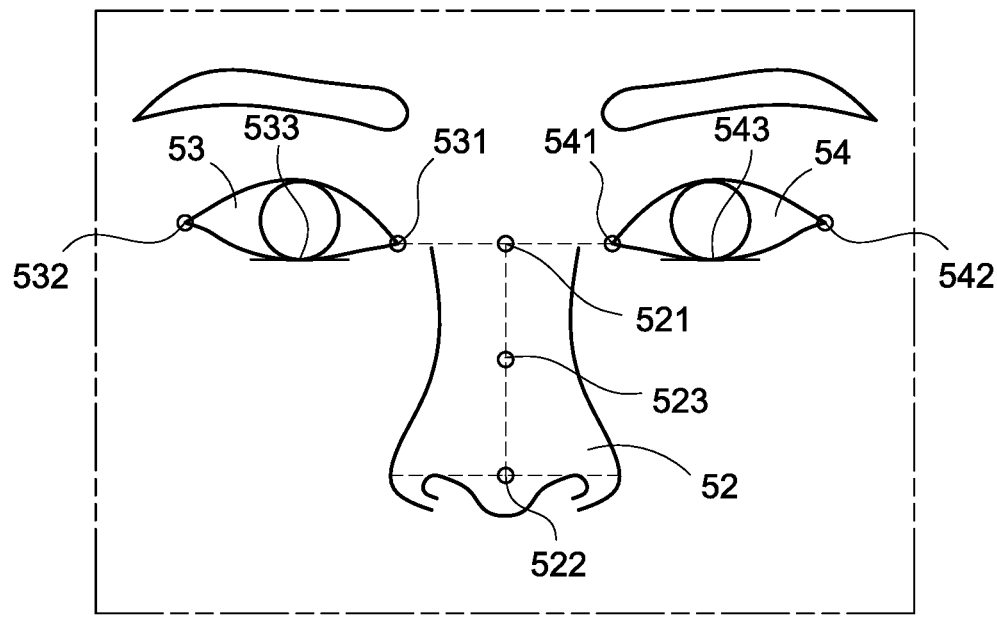
FIG. 9A is a diagram showing first analyzing actions according to a first embodiment of the present invention.
Figure 9B:
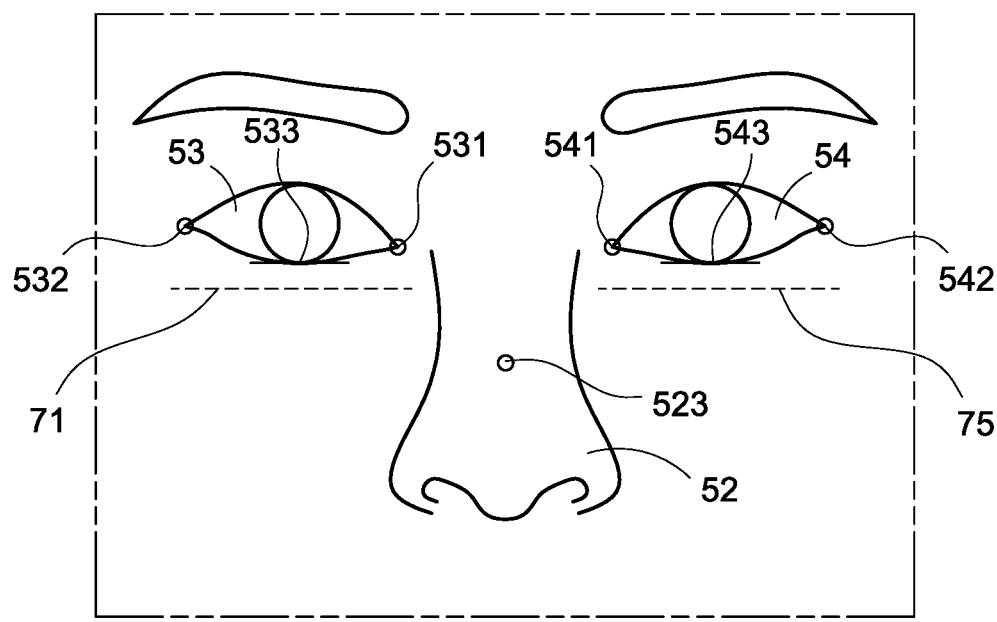
FIG. 9B is a diagram showing second analyzing actions according to the first embodiment of the present invention.
Figure 9C:
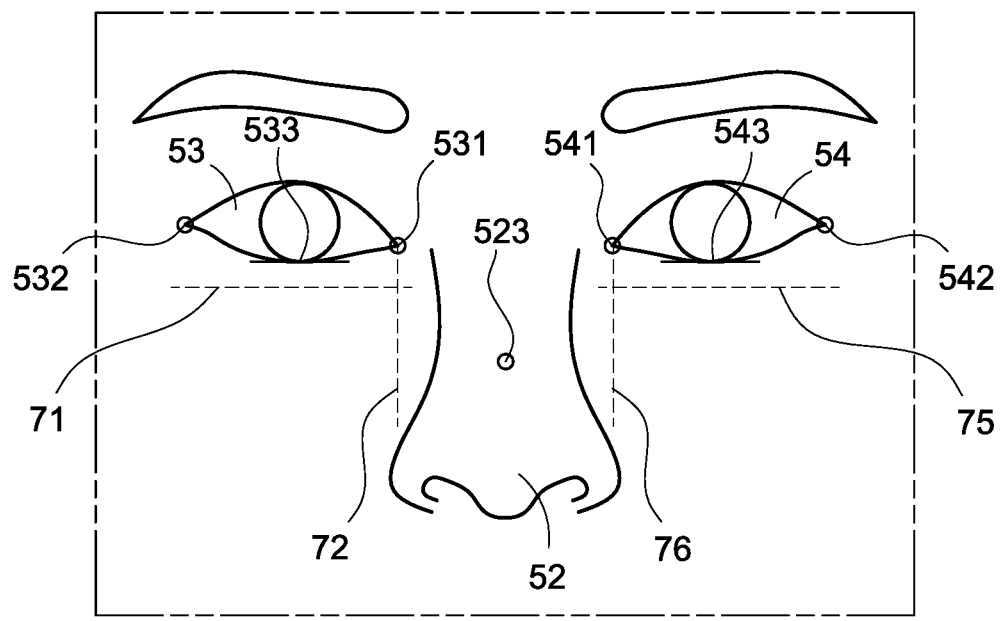
FIG. 9C is a diagram showing third analyzing actions according to the first embodiment of the present invention.
Figure 9D:
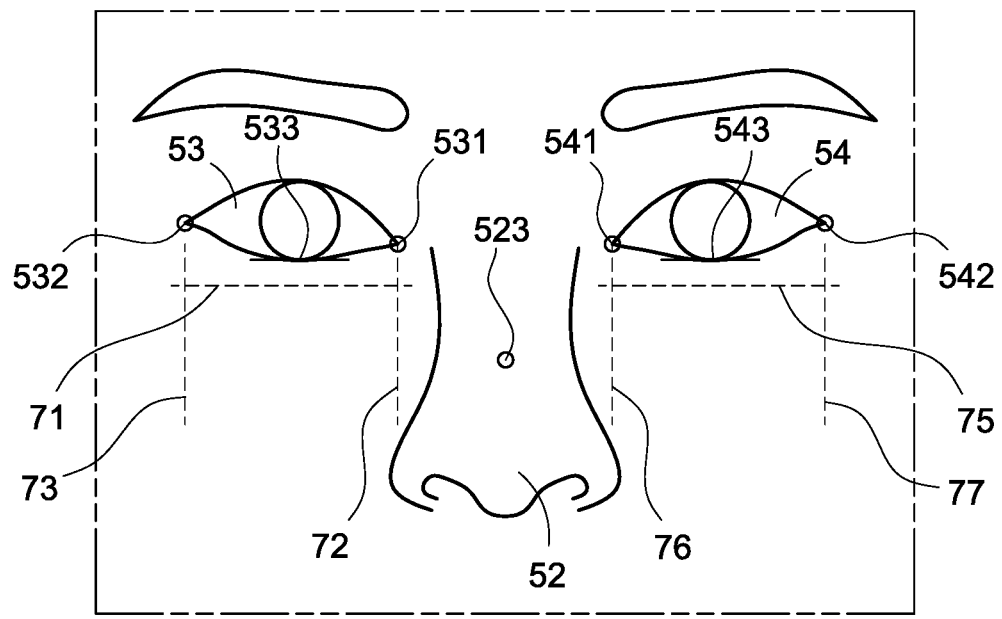
FIG. 9D is a diagram showing fourth analyzing actions according to the first embodiment of the present invention.
Figure 9E:
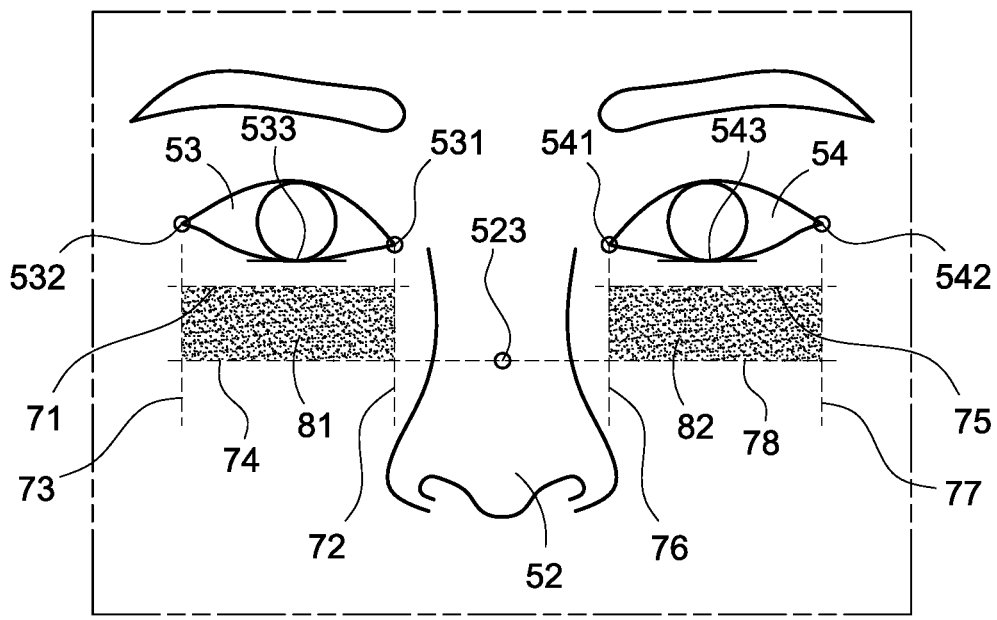
FIG. 9E is a diagram showing fifth analyzing actions according to the first embodiment of the present invention.

Refer to also FIG. 9A to FIG. 9E, wherein FIG. 9A is a diagram showing first analyzing actions according to a first embodiment of the present invention, FIG. 9B is a diagram showing second analyzing actions according to the first embodiment of the present invention, FIG. 9C is a diagram showing third analyzing actions according to the first embodiment of the present invention, FIG. 9D is a diagram showing fourth analyzing actions according to the first embodiment of the present invention, and FIG. 9E is a diagram showing fifth analyzing actions according to the first embodiment of the present invention. The embodiment of FIG. 9A to FIG. 9E is based on the determining module 103 to simultaneously determine the positions of both left foundation and right foundation, but not intended to narrow down the scope of the claims of the present invention.

As shown in FIG. 9A, the determining module 103 may obtain the positions of the nose 52, the left eye 53, and the right eye 54 from the image of the face after the step S18 as shown in FIG. 6B. Next, the determining module 103 generates a line through connecting a nose bridge 521 with a nose tip 522 and fetches a middle point 523 between the nose bridge 521 and the nose tip 522. In the meantime, the determining module 103 further obtains the positions of a corner of left eye 531, an end of left eye 532, and a fundus of left eye 533, and also the positions of a corner of right eye 541, an end of right eye 542, and a fundus of right eye 543.

Next, as shown in FIG. 9B, the determining module 103 may generate a first auxiliary line 71 below the fundus of left eye 533 and parallel with the left eye 53, and also generates a fifth auxiliary line 75 below the fundus of right eye 543 and parallel with the right eye 54. It should be mentioned that the determining module 103 in this embodiment generates the first auxiliary line 71 through moving the fundus of left eye 533 downward for a distance of multiple pixel points (for example, fifty pixel points). Also, the determining module 103 generates the fifth auxiliary line 75 through moving the fundus of right eye 543 downward for the distance of multiple pixel points (for example, fifty pixel points).

Next, as shown in FIG. 9C, the determining module 103 generates a second auxiliary line 72 downward from the corner of left eye 531 and the second auxiliary line 72 is perpendicular to the left eye 53, and the determining module 103 generates a sixth auxiliary line 76 downward from the corner of right eye 541 and the sixth auxiliary line 76 is perpendicular to the right eye 54. As shown in FIG. 9D, the determining module 103 further generates a third auxiliary line 73 downward from the end of left eye 532 and the third auxiliary line 73 is perpendicular to the left eye 53, and also generates a seventh auxiliary line 77 downward from the end of right eye 542 and the seventh auxiliary line 77 is perpendicular to the right eye 54.

Next, as shown in FIG. 9E, the determining module 103 generates a fourth auxiliary line 74 leftward from the middle point 523 of the nose 52 and the fourth auxiliary line 74 is parallel with the left eye 53, and also an eighth auxiliary line 78 rightward from the middle point 523 of the nose 52 and the eighth auxiliary line 78 is parallel with the right eye 54. Therefore, the determining module 103 may constitute the position of a left foundation 81 based on the aforementioned first auxiliary line 71, second auxiliary line 72, third auxiliary line 73, and fourth auxiliary line 74. Also, the determining module 103 may constitute the position of a right foundation 82 based on the aforementioned fifth auxiliary line 75, sixth auxiliary line 76, seventh auxiliary line 77, and eighth auxiliary line 78.

As mentioned above, the analysis apparatus 1 in one of the exemplary embodiments is to obtain the images of the current foundations of the user, and compares the images with the compared image (such as the AR image) selected by the user, so as to determine and display the condition of the current foundations of the user.

Figure 10:
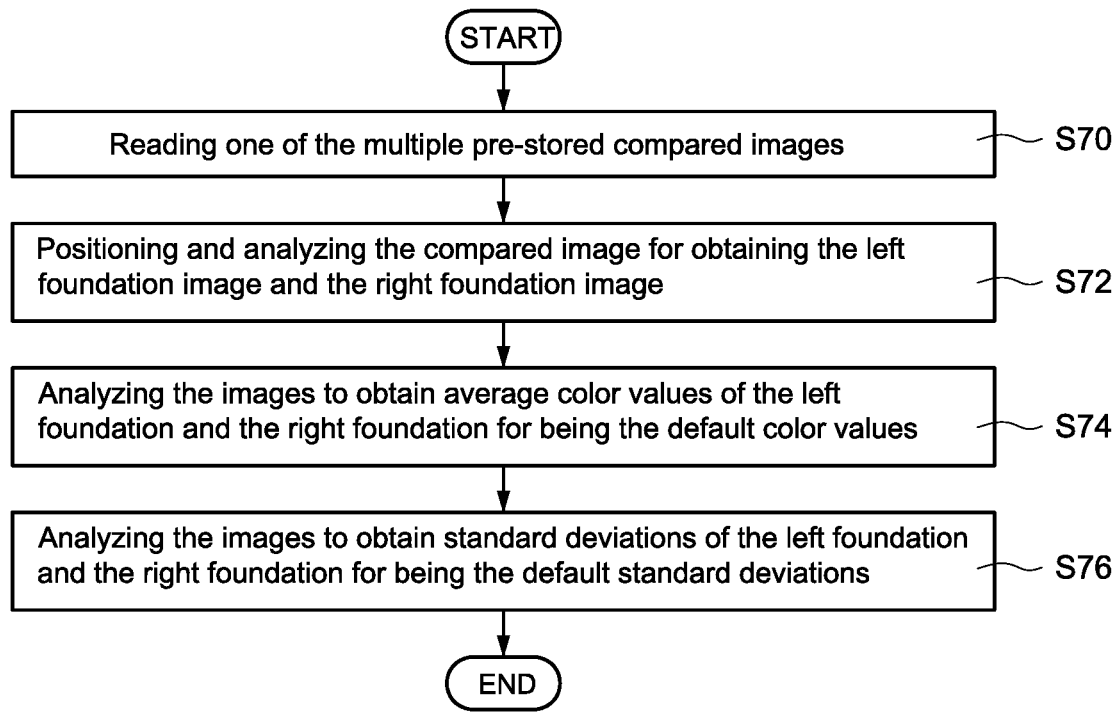
FIG. 10 is a flowchart for analyzing default values according to a first embodiment of the present invention.

Refer to FIG. 10, which is a flowchart for analyzing default values according to a first embodiment of the present invention.

In the embodiment, the analysis apparatus 1 may read one of the multiple pre-stored compared images through the processor 10 (step S70). Next, the processor 10 performs positioning actions on the selected compared image through the positioning module 102, so as to fetch positions of a nose, a left eye, and a right eye from the face image of the compared image, and the determining module 103 may analyze the above positions for obtaining the images of a left foundation and a right foundation (step S72). In this embodiment, the compared image read by the processor 10 in the step S70 is a face image or a partial face image at least including a nose image, a left eye image, and a right eye image.

Next, the processor 10 performs analyzing on the images of the left foundation and the right foundation through the analyzing module 104 for obtaining average color values of the left foundation and the right foundation for being the aforementioned default color values (step S74). On the other hand, the processor 10 also performs analyzing on the images of the left foundation and the right foundation through the analyzing module 104 for obtaining standard deviations of the left foundation and the right foundation for being the aforementioned default standard deviations (step S76). In the embodiment, the analyzing module 104 may apply one or multiple image analyzing algorithms of the related art for analyzing the default color values and the default standard deviations of the left foundation and the right foundation according to the fetched images.

In one of the exemplary embodiments, the user may operate the analysis apparatus 1 before applying cosmetics, and then selects one of the multiple compared images displayed by the display module 111 of the analysis apparatus 1 through the input interface 15. Therefore, the user may first check the selected compared image through the mirror screen 11 for confirming the appearance after applying cosmetics, and decides whether to apply the current displayed compared image or not. As such, the analysis apparatus 1 may compare the condition of the current foundations of the user with the compared image selected by the user in such auxiliary mode for assisting the user to quickly complete the make-up of foundations identical to the compared image.

Figure 11:
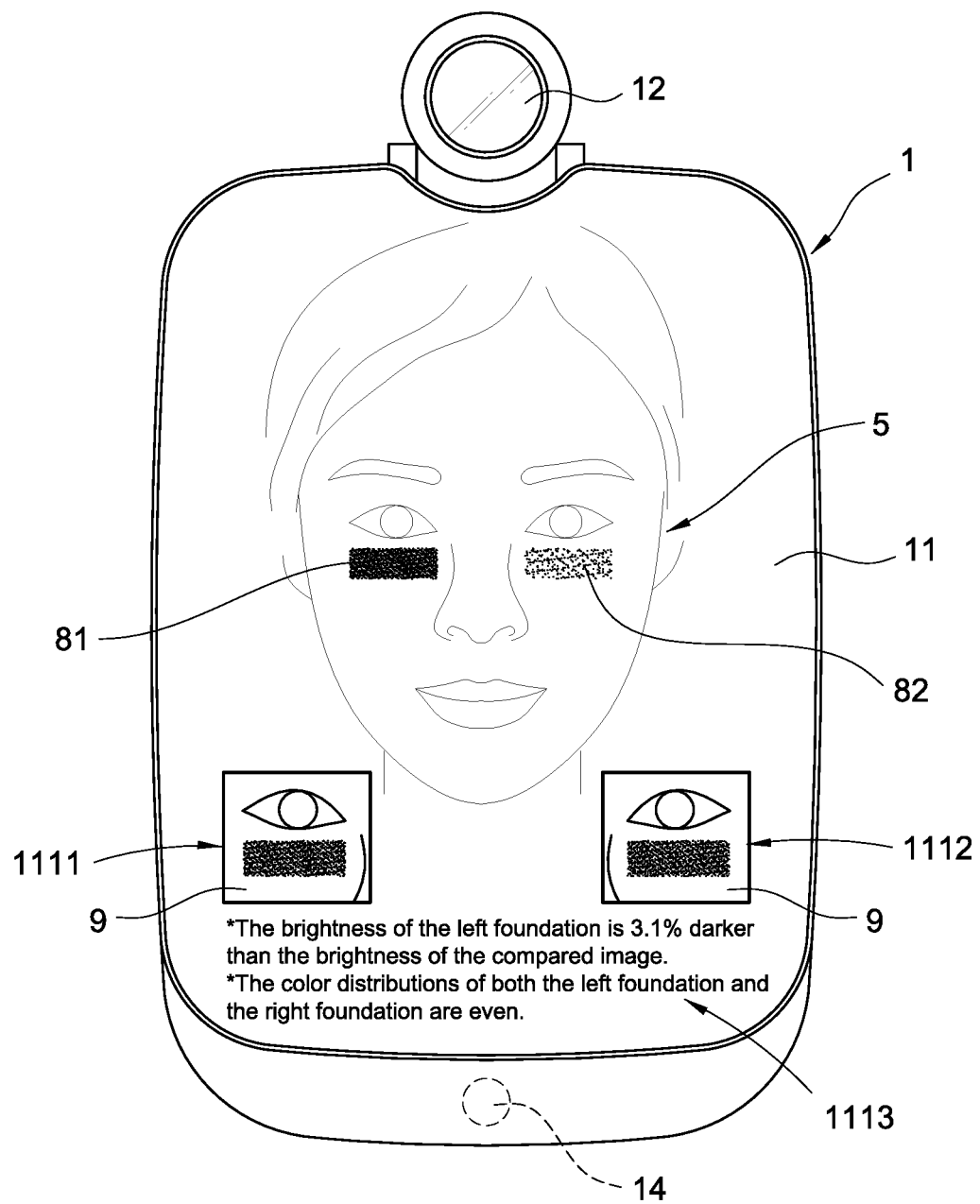
FIG. 11 is a schematic diagram of the analysis apparatus according to a fourth embodiment of the present invention.

FIG. 11 is a schematic diagram of the analysis apparatus according to a fourth embodiment of the present invention. As mentioned above, the analysis apparatus 1 of the present invention is to capture the face image of the user 5 in real-time and analyze the conditions of the left foundation 81 and the right foundation 82 of the user 5. Besides, the analysis apparatus 1 may provide image displaying areas 1111, 1112 on the mirror screen 11, so as to real-time display the selected compared image 9 that is compared with the foundations 81 and 82 of the user 5.

More specific, the analysis apparatus 1 may read the compared image 9 selected by the user 5 from the multiple compared images for processing in advance (such as an enlargement processing), then the analysis apparatus 1 controls the display module 111 to display the entire compared image 9 on the image displaying areas 1111, 1112, or partially displays close-up images corresponding to the positions of a left foundation and a right foundation of the compared image 9.

As shown in FIG. 11, the mirror screen 11 further includes an information displaying area 1113. The analysis apparatus 1 may control the display module 111 to display the aforementioned comparison result (and the second comparison result) on the information displaying area 1113 of the mirror screen 11.

In this embodiment, the user 5 may see a reflect image of his/her own face right on the mirror screen 11, and may see the compared image 9 through the image displaying areas 1111 and 1112. Therefore, the user 5 may realize whether the conditions (such as colors, distributions, etc.) of the left foundation 81 and the right foundation 82 differ from a standard or not (for example, differ from the displayed compared image 9) through the information displaying area 1113.

For an instance, the comparison result in FIG. 11 shows that the brightness of the left foundation 81 is 3.1% darker than the brightness of the compared image 9, and the color distributions of both the left foundation and the right foundation are even. Therefore, the analysis apparatus 1 may effectively assist the user 5 in applying cosmetics for the foundations, so as to increase the make-up speed of the user 5 and also optimize the make-up quality.

By way of the analysis apparatus 1 and the analysis method of the present invention, the user 5 may see his/her face look on the mirror screen 11 and also receive an image analysis upon his/her foundation images while applying cosmetics, so as to apply cosmetics more quickly and accurately.

As the skilled person will appreciate, various changes and modifications can be made to the described embodiment. It is intended to include all such variations, modifications and equivalents which fall within the scope of the present invention, as defined in the accompanying claims.

What is claimed is:

1. A foundation analysis method adopted by a body information analysis apparatus, comprising:
    a) capturing an external image through an image capturing module of the body information analysis apparatus;
    b) performing positioning actions to each facial feature of a face once the face is recognized from the external image by a processor of the body information analysis apparatus;
    c) obtaining positions of a left eye, a right eye, and a nose from the face following step b);
    d) determining a position of a left foundation upon the face according to the positions of the left eye and the nose by the processor, comprising:
        d1) obtaining positions of a nose bridge and a nose tip of the nose upon the face;
        d2) obtaining a middle point of the nose bridge and the nose tip;
        d3) obtaining positions of a corner of left eye, an end of left eye, and a fundus of left eye upon the face;
        d4) generating a first auxiliary line below the fundus of left eye and parallel with the left eye;
        d5) generating a second auxiliary line downward from the corner of left eye and perpendicular to the left eye;
        d6) generating a third auxiliary line downward from the end of left eye and perpendicular to the left eye;
        d7) generating a fourth auxiliary line leftward from the middle point and parallel with the left eye; and
        d8) constituting the position of the left foundation based on the first auxiliary line, the second auxiliary line, the third auxiliary line, and the fourth auxiliary line;
    e) determining another position of a right foundation upon the face according to the positions of the right eye and the nose by the processor;
    f) analyzing average color values of the left foundation and the right foundation respectively by the processor;
    g) comparing the average color values with default color values, or comparing one of the average color values of the left foundation with another one of the average color values of the right foundation, and generating a comparison result; and
    h) displaying the comparison result through a display module of the body information analysis apparatus.

2. The foundation analysis method of claim 1, wherein the step e) comprises following steps:
    e1) obtaining positions of a corner of right eye, an end of right eye, and a fundus of right eye upon the face;
    e2) generating a fifth auxiliary line below the fundus of right eye and parallel with the right eye;
    e3) generating a sixth auxiliary line downward from the corner of right eye and perpendicular to the right eye;
    e4) generating a seventh auxiliary line downward from the end of right eye and perpendicular to the right eye;
    e5) generating an eighth auxiliary line rightward from the middle point and parallel with the right eye; and
    e6) constituting the position of the right foundation based on the fifth auxiliary line, the sixth auxiliary line, the seventh auxiliary line, and the eighth auxiliary line.

3. The foundation analysis method of claim 2, wherein the step d4) is to generate the first auxiliary line through moving the fundus of left eye downward for a distance of fifty pixel points, and the step e2) is to generate the fifth auxiliary line through moving the fundus of right eye for the distance of fifty pixel points.

4. The foundation analysis method of claim 1, further comprising following steps before the step g):
    g01) reading a compared image, wherein the compared image is a face image;
    g02) performing positioning and analyzing on the face image for obtaining a left foundation image and a right foundation image; and
    g03) analyzing average color values of the left foundation image and the right foundation image for being the default color values.

5. The foundation analysis method of claim 1, further comprising following steps:
    i1) determining whether the body information analysis apparatus is turned off; and
    i2) re-executing the step b) to the step h) before the body information analysis apparatus is turned off.

6. The foundation analysis method of claim 1, further comprising following steps:
    j1) determining whether the comparison result is matching with a completion standard; and
    j2) re-executing the step b) to the step h) before the comparison result is determined matching with the completion standard.

7. A body information analysis apparatus, comprising:
an image capturing module, capturing an external image;
a display module; and
a processor electrically connected with the image capturing module and the display module, the processor recognizing the external image for determining whether a face is present in the external image through a face recognizing module, and performing positioning actions to each facial feature of the face through a positioning module once the face is recognized from the external image for obtaining positions of a left eye, a right eye, and a nose from the face;

wherein, the processor determines a position of a left foundation upon the face according to the positions of the left eye and the nose and determines another position of a right foundation upon the face according to the positions of the right eye and the nose through a determining module, and analyzes average color values of the left foundation and the right foundation respectively through executing an algorithm by an analyzing module, and the processor further compares the average color values with default color values, or compares one of the average color values of the left foundation with another one of the average color values of the right foundation through a comparing module for generating a comparison result;

wherein the processor is configured to control the analyzing module to analyze standard deviations (SDs) of the left foundation and the right foundation respectively, and to compare the standard deviations with default standard deviations, or to compare one of the standard deviations of the left foundation with another one of the standard deviations of the right foundation, for generating a second comparison result;

wherein, the display module displays the comparison result and the second comparison result.

8. The body information analysis apparatus of claim 7, wherein the processor reads a compared image and analyzes the compared image for obtaining a left foundation image and a right foundation image, and controls the analyzing module to analyze the left foundation image and the right foundation image for obtaining standard deviations of the left foundation image and the right foundation image respectively for being the default standard deviations, wherein the compared image is a face image.

9. A foundation analysis method adopted by a body information analysis apparatus, comprising:
a) capturing an external image through an image capturing module of the body information analysis apparatus;
b) performing positioning actions to each facial feature of a face once the face is recognized from the external image by a processor of the body information analysis apparatus;
c) obtaining positions of a left eye, a right eye, and a nose from the face following step b);
d) determining a position of a left foundation upon the face according to the positions of the left eye and the nose by the processor;
e) determining another position of a right foundation upon the face according to the positions of the right eye and the nose by the processor;
f) analyzing average color values of the left foundation and the right foundation respectively by the processor;
g) comparing the average color values with default color values, or comparing one of the average color values of the left foundation with another one of the average color values of the right foundation, and generating a comparison result;
h) displaying the comparison result through a display module of the body information analysis apparatus;
i) analyzing standard deviations (SDs) of the left foundation and the right foundation respectively by the processor;
j) comparing the standard deviations with default standard deviations, or comparing one of the standard deviations of the left foundation with another one of the standard deviations of the right foundation, and generating a second comparison result; and
k) displaying the second comparison result on the display module.

10. The foundation analysis method of claim 9, further comprising following steps before the step j):
j01) reading a compared image, wherein the compared image is a face image;
j02) performing positioning and analyzing on the face image for obtaining a left foundation image and a right foundation image; and
j03) analyzing standard deviations of the left foundation image and the right foundation image for being the default standard deviations.

11. A body information analysis apparatus, comprising:
an image capturing module, capturing an external image;
a display module; and
a processor electrically connected with the image capturing module and the display module, the processor recognizing the external image for determining whether a face is present in the external image through a face recognizing module, and performing positioning actions to each facial feature of the face through a positioning module once the face is recognized from the external image for obtaining positions of a left eye, a right eye, and a nose from the face;

wherein, the processor determines a position of a left foundation upon the face according to the positions of the left eye and the nose and determines another position of a right foundation upon the face according to the positions of the right eye and the nose through a determining module, and analyzes average color values of the left foundation and the right foundation respectively through executing an algorithm by an analyzing module, and the processor further compares the average color values with default color values, or compares one of the average color values of the left foundation with another one of the average color values of the right foundation through a comparing module for generating a comparison result;

wherein, the display module displays the comparison result;

wherein the processor is configured to read a compared image and to analyze the compared image for obtaining a left foundation image and a right foundation image, and the processor is configured to control the analyzing module to analyze the left foundation image and the right foundation image for obtaining average color values of the left foundation image and the right foundation image for being the default color values, wherein the compared image is a face image.

12. A body information analysis apparatus, comprising:
an image capturing module, capturing an external image;
a display module; and
a processor electrically connected with the image capturing module and the display module, the processor recognizing the external image for determining whether a face is present in the external image through a face recognizing module, and performing positioning actions to each facial feature of the face through a positioning module once the face is recognized from the external image for obtaining positions of a left eye, a right eye, and a nose from the face;

wherein, the processor determines a position of a left foundation upon the face according to the positions of the left eye and the nose and determines another position of a right foundation upon the face according to the positions of the right eye and the nose through a determining module, and analyzes average color values of the left foundation and the right foundation respectively through executing an algorithm by an analyzing module, and the processor further compares the average color values with default color values, or compares one of the average color values of the left foundation with another one of the average color values of the right foundation through a comparing module for generating a comparison result;

wherein, the display module displays the comparison result;

wherein the processor is configured to control the determining module to execute following activities for determining the positions of the left foundation and the right foundation:

obtaining positions of a nose bridge and a nose tip of the nose upon the face;

obtaining a middle point of the nose bridge and the nose tip;

obtaining positions of a corner of left eye, an end of left eye, and a fundus of left eye upon the face;

generating a first auxiliary line below the fundus of left eye and parallel with the left eye;

generating a second auxiliary line downward from the corner of left eye and perpendicular to the left eye;

generating a third auxiliary line downward from the end of left eye and perpendicular to the left eye;

generating a fourth auxiliary line leftward from the middle point and parallel with the left eye;

constituting the position of the left foundation based on the first auxiliary line, the second auxiliary line, the third auxiliary line, and the fourth auxiliary line;

obtaining positions of a corner of right eye, an end of right eye, and a fundus of right eye upon the face;

generating a fifth auxiliary line below the fundus of right eye and parallel with the right eye;

generating a sixth auxiliary line downward from the corner of right eye and perpendicular to the right eye;

generating a seventh auxiliary line downward from the end of right eye and perpendicular to the right eye;

generating an eighth auxiliary line rightward from the middle point and parallel with the right eye; and constituting the position of the right foundation based on the fifth auxiliary line, the sixth auxiliary line, the seventh auxiliary line, and the eighth auxiliary line.

* * * * *